(12) United States Patent
Nagai et al.

(10) Patent No.: US 12,060,470 B2
(45) Date of Patent: Aug. 13, 2024

(54) FOAMED POLYOLEFIN-BASED-RESIN SHEET

(71) Applicant: SEKISUI CHEMICAL CO., LTD., Osaka (JP)

(72) Inventors: Asami Nagai, Saitama (JP); Daisuke Mukohata, Saitama (JP)

(73) Assignee: Sekisui Chemical Co., Ltd. (JP)

( * ) Notice: Subject to any disclaimer, the term of this patent is extended or adjusted under 35 U.S.C. 154(b) by 533 days.

(21) Appl. No.: 17/279,840

(22) PCT Filed: Sep. 27, 2019

(86) PCT No.: PCT/JP2019/038389
§ 371 (c)(1),
(2) Date: Mar. 25, 2021

(87) PCT Pub. No.: WO2020/067521
PCT Pub. Date: Apr. 2, 2020

(65) Prior Publication Data
US 2021/0395477 A1 Dec. 23, 2021

(30) Foreign Application Priority Data
Sep. 28, 2018 (JP) ................ 2018-185670

(51) Int. Cl.
| | |
|---|---|
| C08K 5/00 | (2006.01) |
| B32B 5/18 | (2006.01) |
| C08J 5/18 | (2006.01) |
| C08J 9/00 | (2006.01) |
| C08J 9/10 | (2006.01) |
| C08K 5/521 | (2006.01) |
| C08L 23/08 | (2006.01) |
| C08L 23/10 | (2006.01) |
| C08L 23/12 | (2006.01) |
| C08L 23/14 | (2006.01) |
| C09J 7/24 | (2018.01) |
| C09J 7/26 | (2018.01) |
| B32B 27/32 | (2006.01) |
| C08G 101/00 | (2006.01) |
| C08K 5/136 | (2006.01) |

(52) U.S. Cl.
CPC ............. *C08J 9/0061* (2013.01); *B32B 5/18* (2013.01); *C08J 5/18* (2013.01); *C08J 9/0038* (2013.01); *C08J 9/103* (2013.01); *C08K 5/0066* (2013.01); *C08K 5/521* (2013.01); *C08L 23/08* (2013.01); *C08L 23/10* (2013.01); *C08L 23/12* (2013.01); *C08L 23/14* (2013.01); *C09J 7/243* (2018.01); *C09J 7/26* (2018.01); *B32B 27/32* (2013.01); *B32B 2264/02* (2013.01); *B32B 2266/025* (2013.01); *B32B 2307/3065* (2013.01); *B32B 2405/00* (2013.01); *C08G 2101/00* (2013.01); *C08J 9/0019* (2013.01); *C08J 2201/026* (2013.01); *C08J 2201/03* (2013.01); *C08J 2203/04* (2013.01); *C08J 2323/06* (2013.01); *C08J 2323/10* (2013.01); *C08J 2323/12* (2013.01); *C08J 2323/14* (2013.01); *C08J 2323/16* (2013.01); *C08J 2423/06* (2013.01); *C08K 5/136* (2013.01); *C08L 2201/02* (2013.01); *C08L 2203/14* (2013.01); *C08L 2205/025* (2013.01); *C09J 2301/122* (2020.08); *C09J 2301/124* (2020.08); *C09J 2301/41* (2020.08); *C09J 2400/243* (2013.01); *C09J 2423/006* (2013.01); *Y10S 428/921* (2013.01); *Y10S 521/907* (2013.01); *Y10T 428/249953* (2015.04); *Y10T 428/249986* (2015.04); *Y10T 428/28* (2015.01)

(58) Field of Classification Search
None
See application file for complete search history.

(56) References Cited

U.S. PATENT DOCUMENTS

| | | | | |
|---|---|---|---|---|
| 3,969,437 | A | | 7/1976 | Shim |
| 3,978,166 | A | * | 8/1976 | Hechenbleikner .... C07F 9/4075 987/44 |
| 4,112,014 | A | * | 9/1978 | Smith .................. C07F 9/6571 987/188 |
| 4,154,721 | A | * | 5/1979 | Valdiserri ............ C08K 5/5357 524/120 |

(Continued)

FOREIGN PATENT DOCUMENTS

| | | | | | |
|---|---|---|---|---|---|
| CN | 1888013 | A | * | 1/2007 | |
| CN | 103554595 | A | * | 2/2014 | ............ C08K 5/053 |

(Continued)

OTHER PUBLICATIONS

Machine Translation of JP-08164579-A, Jun. 1996 (Year: 1996).*
Machine Translation of JP-10298329-A, Nov. 1998 (Year: 1998).*
Machine Translation of JP-2011173941-A, Sep. 2011 (Year: 2011).*
Machine Translation of KR-2017017141-A, Feb. 2017 (Year: 2017).*
Machine Translation of CN-1888013-A, Jan. 2007 (Year: 2007).*
Liu et al., Catalytic action of phospho-tungstic acid in the synthesis of melamine salts of pentaerythritol phosphate and their synergistic effects in flame retarded polypropylene, Oct. 2006, Polymer Degradation and Stability, vol. 91, No. 10, pp. 2513-2519 (Year: 2006).*

(Continued)

*Primary Examiner* — Jeffrey A Vonch
(74) *Attorney, Agent, or Firm* — Foley & Lardner LLP

(57) ABSTRACT

The present invention provides a polyolefin resin foam sheet having an area density of 5 g/m² or more and 400 g/m² or less, and having a time (t) required for a weight decrease from 90% by mass to 10% by mass, of 9 minutes or more, as measured by thermogravimetric analysis carried out at a heating rate of 10° C./min and a measurement temperature of 23° C. to 550° C. According to the present invention, a polyolefin resin foam sheet can be provided that has a high fire retardancy while maintaining a lightweight property.

3 Claims, No Drawings

(56) References Cited

U.S. PATENT DOCUMENTS

| | | | | |
|---|---|---|---|---|
| 4,174,343 A * | 11/1979 | Hardy | ............... | C07F 9/657181 987/44 |
| 4,397,759 A * | 8/1983 | Hancock | ............... | C09K 21/12 428/921 |
| 4,446,254 A * | 5/1984 | Nakae | ........................ | C08J 9/10 524/436 |
| 4,454,064 A * | 6/1984 | Halpern | ............... | C07F 9/65748 558/74 |
| 5,132,171 A * | 7/1992 | Yoshizawa | ............. | C09K 21/14 428/317.1 |
| 5,276,066 A * | 1/1994 | Paulik | ................... | C08K 5/5357 549/216 |
| 5,288,869 A * | 2/1994 | Giroldini | ............. | C08K 5/5357 556/174 |
| 2001/0021449 A1* | 9/2001 | Koshiba | ..................... | C08J 9/10 264/46.7 |
| 2003/0088000 A1* | 5/2003 | Kimura | ................... | C08L 23/10 524/100 |
| 2006/0249715 A1* | 11/2006 | Salyer | ........................ | E04B 1/94 252/601 |
| 2011/0028613 A1* | 2/2011 | Staal | ........................ | C08L 25/12 524/121 |
| 2011/0257310 A1* | 10/2011 | Butz | ..................... | C08K 5/5353 252/609 |
| 2013/0236718 A1* | 9/2013 | Buettner | ..................... | C09J 7/38 428/354 |
| 2015/0133571 A1* | 5/2015 | Claessen | ................... | B32B 5/18 521/85 |
| 2015/0284535 A1* | 10/2015 | Lips | ..................... | C08K 5/3435 524/102 |
| 2017/0015874 A1* | 1/2017 | Kluge-Paletta | ........ | C09K 21/12 |
| 2017/0051132 A1* | 2/2017 | Yamanaka | ................ | D01F 1/07 |
| 2017/0204240 A1 | 7/2017 | Van Ravestyn et al. | | |
| 2019/0264002 A1* | 8/2019 | Wen | ........................ | C09K 21/12 |
| 2021/0395477 A1 | 12/2021 | Nagai et al. | | |
| 2022/0213238 A1 | 7/2022 | Ohta et al. | | |

FOREIGN PATENT DOCUMENTS

| | | | | |
|---|---|---|---|---|
| CN | 106832510 A | * | 6/2017 | ............. C08L 23/06 |
| EP | 327092 A2 | * | 8/1989 | ............ C07F 9/4075 |
| EP | 449689 A1 | * | 10/1991 | ............. C07F 9/091 |
| EP | 3 002 311 A1 | | 4/2016 | |
| JP | S56-116727 A | | 9/1981 | |
| JP | S56-151736 A | | 11/1981 | |
| JP | S57-115432 A | | 7/1982 | |
| JP | 60036535 A | * | 2/1985 | |
| JP | S61-113627 A | | 5/1986 | |
| JP | 62256842 A | * | 11/1987 | |
| JP | 02102234 A | * | 4/1990 | |
| JP | 02209935 A | * | 8/1990 | |
| JP | 03109444 A | * | 5/1991 | |
| JP | 03124743 A | * | 5/1991 | |
| JP | H03-287637 A | | 12/1991 | |
| JP | 07241948 A | * | 9/1995 | |
| JP | 08059871 A | * | 3/1996 | |
| JP | H08-092406 A | | 4/1996 | |
| JP | 08134247 A | * | 5/1996 | |
| JP | 08142241 A | * | 6/1996 | |
| JP | 08164579 A | * | 6/1996 | |
| JP | 08193141 A | * | 7/1996 | |
| JP | 08208866 A | * | 8/1996 | |
| JP | 08225674 A | * | 9/1996 | |
| JP | 08245820 A | * | 9/1996 | |
| JP | H09-048870 A | | 2/1997 | |
| JP | 09272179 A | * | 10/1997 | |
| JP | H09-272179 A | | 10/1997 | |
| JP | 10053661 A | * | 2/1998 | |
| JP | 10287761 A | * | 10/1998 | |
| JP | 10298329 A | * | 11/1998 | |
| JP | H10-298329 A | | 11/1998 | |
| JP | 11209497 A | * | 8/1999 | |
| JP | H11-209497 A | | 8/1999 | |
| JP | H11-279314 A | | 10/1999 | |
| JP | 11322990 A | * | 11/1999 | |
| JP | 2000109705 A | * | 4/2000 | |
| JP | 2000218650 A | * | 8/2000 | |
| JP | 2000327823 A | * | 11/2000 | |
| JP | 2001107569 A | * | 4/2001 | |
| JP | 2002053692 A | * | 2/2002 | |
| JP | 2002-128933 A | | 5/2002 | |
| JP | 2003-026844 A | | 1/2003 | |
| JP | 2004-224904 A | | 8/2004 | |
| JP | 3580556 B2 | | 10/2004 | |
| JP | 2004339300 A | * | 12/2004 | |
| JP | 2005036072 A | * | 2/2005 | |
| JP | 2005-060603 A | | 3/2005 | |
| JP | 2006240207 A | * | 9/2006 | |
| JP | 2007137850 A | * | 6/2007 | |
| JP | 2007-231216 A | | 9/2007 | |
| JP | 2008201826 A | * | 9/2008 | |
| JP | 2011-052044 A | | 3/2011 | |
| JP | 2011-173941 A | | 9/2011 | |
| JP | 2011173941 A | * | 9/2011 | |
| JP | 2012-019001 A | | 1/2012 | |
| JP | 2014-105329 A | | 6/2014 | |
| JP | 2014-152218 A | | 8/2014 | |
| JP | 2015-525252 A | | 9/2015 | |
| JP | 2015-189975 A | | 11/2015 | |
| JP | 2017-145367 A | | 8/2017 | |
| JP | 2017145367 A | * | 8/2017 | |
| JP | 6263307 B1 | | 1/2018 | |
| JP | 6845349 B2 | | 3/2021 | |
| KR | 2010000353 A | * | 1/2010 | |
| KR | 2017017141 A | * | 2/2017 | ............... C08J 3/22 |
| TW | 200927894 A | * | 7/2009 | |
| WO | WO-2009/044690 A1 | | 4/2009 | |
| WO | WO-2016/052557 A1 | | 4/2016 | |
| WO | WO-2016/052739 A1 | | 4/2016 | |
| WO | WO-2016052739 A1 | * | 4/2016 | ............... C08J 9/16 |
| WO | WO-2018036398 A1 | * | 3/2018 | |

OTHER PUBLICATIONS

Wang et al., Fire retardancy of a reactively extruded intumescent flame-retardant polyethylene system enhanced by metal chelates, Aug. 2007, Polymer Degradation and Stability, vol. 92, No. 8, pp. 1592-1598 (Year: 2007).*

Liu et al., A novel intumescent flame-retardant LDPE system and its thermo-oxidative degradation and flame-retardant mechanisms, May 2008, Polymers for Advanced Technologies, vol. 19, No. 11, pp. 1566-1575 (Year: 2008).*

International Searching Authority, "International Search Report," issued in connection with International Patent Application No. PCT/JP2019/038393, dated Dec. 17, 2019.

Chen, et al., "TG-MS Studies on Polystyrene, Its Derivatives, and Polyolefins—Relation between Thermamal Decomposition Behavior and Ceiling Temperature", J. Mass Spectrom. Soc. Jpn. vol. No. 47, No. 6, 1999, (18 pages).

Experimental transcripts filed by Opponent for Opposition against Japanese Patent No. 6845348, Jul. 30, 2021, (35 pages).

Experimental transcripts filed by Opponent for Opposition against Japanese Patent No. 6845349, Jul. 30, 2021, (63 pages).

Explanation of circumstances regarding accelerated examination for Japanese Application No. 2019-557508 filed by Applicant on Dec. 14, 2020, (7 pages).

Explanation of circumstances regarding accelerated examination for Japanese Application No. 2019-557507 filed by Applicant on Dec. 14, 2020, (4 pages).

Maki et al., Plastic Foam Handbook, published by Nikkan Kogyo (published Feb. 28, 1973), (7 pages).

Toray Research Center, Inc., "Kinetic analysis of pyrolysis reaction by TG-MS", Mar. 4, 2021, URL: https://cs2.toray.co.jp/news/trc/news_rd01.nsf/0/506210B45A92A06C4925867F00049223?open, (11 pages).

Ishii, Written Opinion issued in connection with JP Appl. Ser. No. 2021-700868 dated Mar. 9, 2022, without English translation (113 pages).

(56) References Cited

OTHER PUBLICATIONS

Office Action dated Aug. 27, 2021 issued in a corresponding Chinese Patent Application No. 201980063067.0, (9 pages).
International Searching Authority, "International Search Report," issued in connection with International Patent Application No. PCT/JP2019/038389, mailed Dec. 17, 2019.
Machine Translation of JP 2011-173941-A.
International Searching Authority, "Written Opinion," issued in connection with International Patent Application No. PCT/JP2019/038389, mailed Dec. 17, 2019.

* cited by examiner

FOAMED POLYOLEFIN-BASED-RESIN SHEET

CROSS-REFERENCE TO RELATED APPLICATIONS

The present application claims priority under 37 U.S.C. § 371 to International Patent Application No. PCT/JP2019/038389, filed Sep. 27, 2019, which claims priority to and the benefit of Japanese Patent Application No. 2018-185670, filed on Sep. 28, 2018. The contents of these applications are hereby incorporated by reference in their entireties.

TECHNICAL FIELD

The present invention relates to a polyolefin resin foam sheet obtained by foaming a polyolefin resin, and in particular to a polyolefin resin foam sheet used for an impact absorbing material installed in an aircraft.

BACKGROUND ART

Conventionally, polyolefin resin foams have excellent properties, such as a lightweight property, thermal insulation property, impact absorption, water resistance, chemical resistance, and mechanical strength, and therefore have been used in a wide range of fields such as building materials, electrical appliances, automobiles, and aircraft. Since polyolefin resin foams are flammable, various kinds of fire retardants are blended in a relatively large amount when used in applications that require fire retardancy. For example, Patent Literature 1 discloses a non-halogen fire retardant resin foam obtained by cross-linking and foaming a resin composition containing 100 parts by weight of a resin component composed of 90 to 30% by weight of a specific ethylene copolymer, 50 to 150 parts by weight of a predetermined metal hydroxide, 2 to 25 parts by weight of red phosphorus, 2 to 25 parts by weight of titanium oxide, and 0.1 to 5 parts by weight of a heat stabilizer.

CITATION LIST

Patent Literature

PTL1: JP 3580556 B

SUMMARY OF INVENTION

Technical Problem

When a large amount of fire retardant is blended in a resin composition as in the resin foam described in Patent Literature 1, the viscosity is outside of a proper range, so that a foaming property deteriorates and a foam density increases. As a result, the weight of the foam sheet increases, which makes it difficult to use for applications requiring a lightweight property, such as in aircraft, for example.

The present invention has been made in view of the conventional circumstances described above, and the present invention provides a polyolefin resin foam sheet having a high fire retardancy while maintaining a lightweight property.

Solution to Problem

The present inventors have discovered, as a result of diligent studies that a polyolefin resin foam sheet having both a lightweight property and fire retardancy can be obtained by setting an area density to a predetermined range, and setting a time (t) required for a weight decrease from 90% by mass to 10% by mass as measured by thermogravimetric analysis to a predetermined value or more, thereby completing the present invention.

That is, the gist of the present invention is described in the following [1] to [9].

[1] A polyolefin resin foam sheet having an area density of 5 $g/m^2$ or more and 400 $g/m^2$ or less, and having a time (t) required for a weight decrease from 90% by mass to 10% by mass, of 9 minutes or more, as measured by thermogravimetric analysis carried out at a heating rate of 10° C./min and a measurement temperature of 23° C. to 550° C.

[2] The polyolefin resin foam sheet according to [1], wherein the polyolefin resin foam sheet has an apparent density of 0.045 $g/cm^3$ or less.

[3] The polyolefin resin foam sheet according to [1] or [2], wherein the polyolefin resin foam sheet has a thickness of 15 mm or less.

[4] The polyolefin resin foam sheet according to any of [1] to [3], wherein a polyolefin resin constituting the polyolefin resin foam sheet is one or more selected from the group consisting of a polyethylene resin and a polypropylene resin.

[5] The polyolefin resin foam sheet according to [4], wherein the polyolefin resin is a combination of a polyethylene resin and a polypropylene resin.

[6] The polyolefin resin foam sheet according to any of [1] to [5], wherein the polyolefin resin foam sheet comprises a fire retardant.

[7] The polyolefin resin foam sheet according to [6], wherein the fire retardant includes one or more selected from the group consisting of a phosphate, a polyphosphate, a phosphorus spiro compound, and a halogen fire retardant.

[8] The polyolefin resin foam sheet according to [6] or [7], wherein the fire retardant includes one or more selected from the group consisting of a phosphate, a polyphosphate, and a phosphorus spiro compound.

[9] The polyolefin resin foam sheet according to any one of [1] to [8], wherein the polyolefin resin foam sheet has a remaining weight percent when heated to 400° C. of 40% by mass or more as measured by the thermogravimetric analysis.

Advantageous Effects of Invention

According to the present invention, a polyolefin resin foam sheet can be provided that has a high fire retardancy while maintaining a lightweight property.

DESCRIPTION OF EMBODIMENTS

[Polyolefin Resin Foam Sheet]

The polyolefin resin foam sheet of the present invention (hereinafter, also referred to as "foam sheet") has an area density of 5 $g/m^2$ or more and 400 $g/m^2$ or less, and has a time (t) required for a weight decrease from 90% by mass to 10% by mass, of 9 minutes or more, as measured by thermogravimetric analysis carried out at a heating rate of 10° C./min and a measurement temperature of 23° C. to 550° C. In the present invention, the foam sheet has an area density of 5 $g/m^2$ or more and 400 $g/m^2$ or less, and therefore has a light weight and can be used for applications requiring reduced weight, such as aircraft. Further, since the time (t)

required for a weight decrease from 90% by mass to 10% by mass is 9 minutes or more, the foam sheet has excellent fire retardancy.

A polyolefin resin foam sheet of the present invention will now be described in more detail.

<Area Density>

The foam sheet of the present invention has an area density of 5 g/m² or more and 400 g/m² or less. If the area density is less than 5 g/m², the density of the foam sheet becomes too small, so that the mechanical strength is reduced and the impact absorption is also reduced. On the other hand, if the area density exceeds 400 g/m², the weight of the foam sheet increases, which means that the foam sheet can no longer be used for applications requiring a lightweight property, such as in aircraft. Further, when the area density exceeds 400 g/m², the fire retardancy deteriorates. From these viewpoints, the area density of the foam sheet is preferably 10 g/m² or more, more preferably 20 g/m² or more, and further preferably 30 g/m² or more, and is preferably 350 g/m² or less, more preferably 300 g/m² or less, and further preferably 250 g/m² or less. Generally, a foam sheet containing a fire retardant tends to have a high area density, but in the present invention, the above-described range can be achieved and a lightweight foam sheet can be obtained by adjusting the crosslinking degree, the foaming ratio, and the amount of the fire retardant.

In the present invention, the area density can be measured by the method described in the Examples.

<Time (t) Required for Weight Decrease from 90% by Mass to 10% by Mass>

The foam sheet of the present invention has a time (t) required for a weight decrease from 90% by mass to 10% by mass, of 9 minutes or more, as measured by thermogravimetric analysis carried out at a heating rate of 10° C./min and a measurement temperature of 23° C. to 550° C. If the time (t) is less than 9 minutes, this means that the foam sheet cannot exhibit excellent fire retardancy. Therefore, the time (t) is preferably 12 minutes or more, more preferably 15 minutes or more, and further preferably 17 minutes or more. This time can be set to be not less than the above-described lower limit value by adjusting the type and content of the fire retardant.

<400° C. Remaining Weight Percent (% by Mass)>

In the above-described thermogravimetric analysis, the foam sheet of the present invention preferably has a remaining weight percent of 40% by mass or more when heated to 400° C. When the remaining weight percent is 40% by mass or more, this means that the fire retardancy is excellent, and the foam sheet can be suitably used particularly in applications such as aircraft. From this viewpoint, the remaining weight percent is preferably 50% by mass or more, more preferably 60% by mass or more, and further preferably 70% by mass or more. The remaining weight percent can be set to be not less than the lower limit value by adjusting the amount of the fire retardant and the cross-linking degree, which are described later.

<Apparent Density>

In the present invention, the foam sheet has an apparent density of preferably 0.045 g/cm³ or less. When the apparent density of the foam sheet is 0.045 g/cm³ or less, the foam sheet can have a sufficiently reduced weight. From the viewpoint of reducing the weight of the foam sheet, the foam sheet has an apparent density of more preferably 0.040 g/cm³ or less, and further preferably 0.035 g/cm³ or less. On the other hand, the foam sheet has an apparent density of preferably 0.010 g/cm³ or more, and more preferably 0.013 g/cm³ or more. When the apparent density of the foam sheet is 0.010 g/cm³ or more, it is possible to secure the mechanical strength while maintaining a lightweight property.

When the foam sheet contains a fire retardant as in the present invention, the viscosity of the expandable composition increases, which means that it is difficult to increase the expansion ratio and reduce the density. However, in the present invention, by using a fire retardant like that used in Examples described later, because expansion is made to occur while adjusting the crosslinking degree and the like, it is possible to adjust the apparent density to be within the above-described range.

<Crosslinking Degree (Gel Fraction)>

From the viewpoint of improving mechanical strength even when lightweight, the foam sheet of the present invention is preferably crosslinked. In that case, the crosslinking degree (gel fraction) is preferably 15 to 65% by mass, and more preferably 20 to 60% by mass. When the gel fraction is equal to or more than this lower limit value, sufficient crosslinks are formed in the foam sheet, and therefore the mechanical strength tends to increase. Further, when the crosslinking degree is equal to or less than the upper limit value, it is easier to secure the flexibility of the foam sheet. Further, by setting the crosslinking degree to be within the above-described range, it is easier to adjust the area density to be within the above-described range. From such a viewpoint, the crosslinking degree is further preferably 25 to 55% by mass, even further preferably 30 to 55% by mass, and even further preferably 35 to 55% by mass.

The crosslinking degree can be measured by the measurement method described later.

<Thickness>

From the viewpoint of improving mechanical strength and impact absorption, the foam sheet of the present invention has a thickness of preferably 15 mm or less, more preferably 2 to 15 mm, and further preferably 3 to 14 mm.

<25% Compressive Strength>

The foam sheet has a 25% compressive strength of preferably 10 to 100 kPa. When the 25% compressive strength is equal to or less than the upper limit value, the flexibility of the foam sheet is improved, and conformability to the adherend is improved when used as a pressure-sensitive adhesive tape, for example. On the other hand, when the 25% compressive strength is equal to or more than the lower limit value, impact absorption and impact resistance are both improved. From these viewpoints, the foam sheet has a 25% compressive strength of more preferably 15 to 80 kPa, and further preferably 15 to 50 kPa.

The 25% compressive strength can be measured according to the method described in the Examples described later.

<Polyolefin Resin>

Examples of the polyolefin resin include a polyethylene resin, a polypropylene resin, an ethylene-vinyl acetate copolymer, and the like. Among these, it is preferable to use one or more selected from the group consisting of a polyethylene resin and a polypropylene resin, and it is more preferable to use a polyethylene resin and a polypropylene resin in combination. By using a polyethylene resin and a polypropylene resin in combination, it is easier to adjust the crosslinking degree and expansion ratio, and therefore it is easier to obtain a foam sheet having an excellent lightweight property.

<<Polyethylene Resin>>

Examples of the polyethylene resin include a low density polyethylene resin (0.93 g/cm³ or less, LDPE), a medium density polyethylene resin (more than 0.930 g/cm³ and less than 0.942 g/cm³, MDPE), and a high density polyethylene resin (0.942 g/cm³ or more, HDPE). Further, a suitable specific example of the low density polyethylene resin is a linear low density polyethylene resin (LLDPE).

Among these, a linear low density polyethylene resin and a high density polyethylene resin are preferable, and a low density polyethylene resin is more preferable. By using these resins, it is easier to reduce the rate of change in compressive strength of the foam sheet.

The linear low density polyethylene resin has a density of preferably 0.90 g/cm$^3$ or more, and more preferably 0.91 g/cm$^3$ or more and 0.93 g/cm$^3$ or less. The high density polyethylene resin has a density of preferably 0.98 g/cm$^3$ or less, and more preferably 0.95 g/cm$^3$ or more and 0.97 g/cm$^3$ or less. By setting the density of the high density polyethylene resin or the linear low density polyethylene resin to within these ranges, it is easier to reduce the rate of change in compressive strength without impairing the flexibility of the foam sheet.

The polyethylene resin may be a homopolymer of ethylene, but may also be a copolymer or the like of ethylene and a small amount of an α-olefin, in which ethylene is the main component (preferably 75% by mass or more, and more preferably 90% by mass or more, of all the monomers). Examples of the α-olefin include an α-olefin having 3 to 12 carbon atoms, and more preferably 4 to 10 carbon atoms. Specifically, examples include 1-butene, 1-pentene, 1-hexene, 4-methyl-1-pentene, 1-heptene, 1-octene, and the like. In the copolymer, these α-olefins can be used alone or in combination of two or more.

Further, the polyethylene resin may be used alone or in combination of two or more.

<<Polypropylene Resin>>

The polypropylene resin may be homopolypropylene, which is a homopolymer of propylene, and examples of the polypropylene resin include a copolymer of propylene with a small amount of ethylene and a small amount of α-olefin other than propylene, in which propylene is the main component (preferably 75% by mass or more, and more preferably 90% by mass or more, of all the monomers).

Examples of the copolymer include a block copolymer, a random copolymer, a random block copolymer, and the like. Among these, a random copolymer (that is, a random polypropylene) is preferable.

Examples of the α-olefin other than propylene include an α-olefin having about 4 to 10 carbon atoms, such as 1-butene, 1-pentene, 1-hexene, 4-methyl-1-pentene, 1-heptene, and 1-octene. Among these, ethylene is preferable from the viewpoint of a formability and heat resistance. In the copolymer, these α-olefins can be used alone or in combination of two or more.

Further, the polypropylene resin may be used alone or in combination of two or more.

Examples of the ethylene-vinyl acetate copolymer used as the polyolefin resin include an ethylene-vinyl acetate copolymer containing 50% by mass or more of an ethylene-derived structural unit.

In the present invention, any of a polyethylene resin, a polypropylene resin, or a mixture thereof, which have been polymerized with a polymerization catalyst such as a Ziegler-Natta compound, a metallocene compound, or a chromium oxide compound may be used. By using a polyethylene resin obtained using a metallocene compound polymerization catalyst, particularly a linear low density polyethylene, it is easier to obtain a foam sheet having high flexibility and high impact absorption.

<Fire Retardant>

The foam sheet of the present invention preferably includes a fire retardant, and examples of the fire retardant include a phosphorus fire retardant and a halogen fire retardant. Among these fire retardants, one or more selected from the group consisting of a phosphate, a polyphosphate, a phosphorus spiro compound, and a halogen fire retardant are preferable. Among the above, the phosphorus fire retardant is preferable, and one or more selected from the group consisting of a phosphate, a polyphosphate, and a phosphorus spiro compound is more preferable. Since such a fire retardant prevents the viscosity of the expandable composition from being excessively high in relation to the foaming agent described later, it is easier to adjust the apparent density of the foam sheet to be within the above-described range. Therefore, by using the fire retardant, it is easier to obtain a foam sheet having both fire retardancy and a lightweight property.

<<Phosphorus Fire Retardant>>

Examples of the phosphorus fire retardant include a phosphate such as melamine orthophosphate and piperazine orthophosphate, a polyphosphate such as ammonium polyphosphate, melamine polyphosphate, and melamine polyphosphate-melam-melem, a phosphazene compound, a phosphorus spiro compound, and the like. Among these, a phosphate, a polyphosphate, and a phosphorus spiro compound are more preferable from the viewpoint that their influence on the viscosity of the expandable composition is small and the expansion ratio can be easily adjusted.

[Phosphate and Polyphosphate]

Examples of the phosphate include melamine orthophosphate, piperazine orthophosphate, melamine pyrophosphate, piperazine pyrophosphate, calcium phosphate, magnesium phosphate, and the like.

Examples of the polyphosphate include ammonium polyphosphate, melamine polyphosphate, melamine polyphosphate-melam-melem, piperazine polyphosphate, and the like.

Among these, one or more selected from the group consisting of melamine pyrophosphate, piperazine pyrophosphate, and ammonium polyphosphate is preferable, and it is more preferable to use piperazine pyrophosphate and melamine pyrophosphate in combination. When piperazine pyrophosphate and melamine pyrophosphate are used in combination, a mass ratio of the melamine pyrophosphate to the piperazine pyrophosphate (melamine pyrophosphate/piperazine pyrophosphate) is preferably 0.25 or more and 1.0 or less.

The "melamine" or "piperazine" in the above-described examples of the phosphate and the polyphosphate may be substituted for compounds having the name N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, phthalodiguanamine, melamine cyanurate, melamine pyrophosphate, butylene diguanamine, norbornene diguanamine, methylene diguanamine, ethylene dimelamine, trimethylene dimelamine, tetramethylene dimeramine, hexamethylene dimelamine, or 1,3-hexylene melamine.

In the present invention, one of the above-described phosphate and polyphosphate may be used alone, or two or more selected from the group consisting of the phosphate and the polyphosphate may be mixed and used as an intumescent fire retardant. Further, as an intumescent fire retardant, one or more selected from the group consisting of the above-described phosphate and polyphosphate and a metal oxide may be mixed and used.

Examples of the metal oxide used in combination with one or more selected from the group consisting of the phosphate and the polyphosphate include zinc oxide, magnesium oxide, calcium oxide, silicon dioxide, titanium oxide, manganese oxide ($MnO$, $MnO_2$), iron oxide ($FeO$, $Fe_2O_3$, $Fe_3O_4$), copper oxide, nickel oxide, tin oxide, aluminum oxide, calcium aluminate, and the like. Among these, zinc oxide, magnesium oxide, and calcium oxide are preferable.

In the case of using one or more selected from the group consisting of the phosphate and the polyphosphate mixed with the metal oxide, it is preferable to adjust the mass ratio thereof as follows. From the viewpoint of improving fire retardancy, the mass ratio of the one or more selected from the group consisting of the phosphate and the polyphosphate to the metal oxide [total mass of phosphate and polyphosphate/mass of metal oxide] is preferably 4 or more and 100 or less, more preferably 6 or more and 50 or less, and further preferably 10 or more and 35 or less.

Examples of commercially available products of the fire retardant including one or more selected from the group consisting of the phosphate and the polyphosphate include "ADK STAB FP-2100J", "ADK STAB FP-2200S", and "ADK STAB FP-2500S" manufactured by ADEKA Corporation, "EXOLIT AP422" and "EXOLIT AP462" manufactured by Clariant Japan K.K., and the like.

[Phosphazene Compound]

The phosphazene compound is an organic compound having a —P=N— bond in the molecule. The phosphazene compound is preferably a compound represented by the following formula (1) because such a compound has a relatively high decomposition temperature.

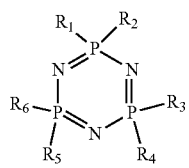

(1)

In the above formula (1), $R_1$ to $R_6$ each independently represent any of an alkyl group having 1 to 12 carbon atoms, an alkoxy group having 1 to 12 carbon atoms, an aryloxy group having 6 to 12 carbon atoms, an amino group, or a halogen atom.

Examples of such a phosphazene compound include "SPB-100" and the like, which is commercially available from Otsuka Chemical Co., Ltd.

[Phosphorus Spiro Compound]

The phosphorus spiro compound is not particularly limited as long as it is a spiro compound having a phosphorus atom. A spiro compound is a compound having a structure in which two cyclic compounds share one carbon, and a spiro compound having a phosphorus atom is a compound in which at least one of the elements constituting the two cyclic compounds is a phosphorus atom.

As the phosphorus spiro compound, for example, it is preferable to use a compound having a structure represented by the following formula (2) in the molecule. In formula (2), * indicates a linking portion with another substituent.

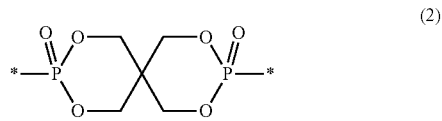 [SMILES: *P1(=O)OCC2(CO1)COP(*)(=O)OC2]

(2)

<<Halogen Fire Retardant>>

In the present invention, a halogen fire retardant may be used. The halogen fire retardant stabilizes active OH radicals by a radical trapping effect in the gas phase. Further, during combustion, active OH radicals and H radicals that act as combustion promoters are trapped and stabilized by hydrogen halides generated from the halogen fire retardant. In addition, the hydrogen halides generated from the halogen fire retardant during combustion are nonflammable, and therefore they bring about a dilution effect and also an oxygen blocking effect.

The halogen fire retardant is not particularly limited as long as it is a fire retardant containing halogen in its molecular structure. Examples of the halogen fire retardant include a bromine fire retardant and a chlorine fire retardant, and among them, a bromine fire retardant is preferable.

The bromine fire retardant is not particularly limited as long as it is a fire retardant containing bromine in its molecular structure. Examples of the bromine fire retardants include decabromodiphenyl ether, octabromodiphenyl ether, tetrabromobisphenol A (TBBA), TBBA epoxy oligomer, TBBA carbonate oligomer, TBBA bis(dibromopropyl ether), TBBA bis(aryl ether), bis(pentabromophenyl)ethane, 1,2-bis (2,4,6-tribromophenoxy)ethane, 2,4,6-tris(2,4,6-tribromophenoxy)-1,3,5-triazine, 2,6- or (2,4-)dibromophenol homopolymer, brominated polystyrene, polybrominated styrene, ethylenebistetrabromophthalimide, hexabromocyclododecane, hexabromobenzene, pentabromobenzyl acrylate monomer, pentabromobenzyl acrylate polymer, and the like. Among these, bis(pentabromophenyl)ethane is preferable from the viewpoint of fire retardancy and foaming property. One of these bromine fire retardants may be used alone, or two or more may be mixed and used.

In the case of using the halogen fire retardant, an antimony fire retardant aid may be used in combination therewith. Based on a synergistic effect with the halogen fire retardant, the antimony fire retardant aid can improve the fire retardancy of the foam sheet, and contain lower the content of the halogen fire retardant. When an antimony fire retardant aid is used, the antimony fire retardant aid reacts with the halogen fire retardant during combustion and turns into a nonflammable halogenated antimony. As a result, an oxygen blocking effect is produced.

Examples of the antimony fire retardant aid include antimony trioxide and antimony pentoxide, and commercially available products include, for example, "PATOX-M", "PATOX-MK", "PATOX-K", and the like, manufactured by Nihon Seiko Co., Ltd.

From the viewpoint of a synergistic effect with the halogen fire retardant, the blended amount of the antimony fire retardant aid is preferably 20 to 80 parts by mass, more preferably 30 to 70 parts by mass, and further preferably 40 to 60 parts by mass, with respect to 100 parts by mass of the halogen fire retardant.

<<Melting Point of Fire Retardant>>

The melting point of the fire retardant used in the present invention is preferably about the same as or higher than the foaming temperature of the foam sheet. When the melting point of the fire retardant is about the same as or higher than the foaming temperature, the fire retardant tends to melt due to the heat during combustion, and combustion of the foam sheet can be suppressed. From this viewpoint, the melting point of the fire retardant is preferably 240 to 600° C., more preferably 250 to 550° C., and further preferably 255 to 500° C.

The content of the fire retardant in the foam sheet is preferably 1 to 100 parts by mass, more preferably 3 to 80 parts by mass, and further preferably 5 to 50 parts by mass, with respect to 100 parts by mass of the polyolefin resin. By setting the content of the fire retardant to be 1 part by mass or more, the fire retardancy of the foam sheet is improved, and by setting the content to be 100 parts by mass or less, the weight of the foam sheet is maintained and processability and the like is improved.

<Foaming Agent>

The foam sheet of the present invention can be obtained by foaming an expandable composition including a polyolefin resin and a foaming agent. As the foaming agent, a thermally decomposable foaming agent is preferable.

An organic foaming agent and an inorganic foaming agent can be used as the thermally decomposable foaming agent. Examples of the organic foaming agent include an azo compound such as azodicarbonamide, an azodicarboxylic acid metal salt (such as barium azodicarboxylate), and azobisisobutyronitrile, a nitroso compound such as N,N'-dinitrosopentamethylenetetramine, a hydrazine derivative such as a hydrazodicarbonamide, 4,4'-oxybis(benzenesulfonyl hydrazide), and toluenesulfonyl hydrazide, a semicarbazide compound such as toluenesulfonyl semicarbazide, and the like.

Examples of the inorganic foaming agent include ammonium carbonate, sodium carbonate, ammonium hydrogencarbonate, sodium hydrogencarbonate, ammonium nitrite, sodium borohydride, monosoda anhydrous citrate, and the like.

Among these, from the viewpoint of obtaining fine cells, and from the viewpoint of economy and safety, an azo compound is preferable, and azodicarbonamide is more preferable.

The thermally decomposable foaming agent may be used alone or in combination of two or more.

The content of the foaming agent in the expandable composition is preferably 1 part by mass or more and 40 parts by mass or less, more preferably 5 parts by mass or more and 35 parts by mass or less, and further preferably 10 parts by mass or more and 30 parts by mass or less, with respect to 100 parts by mass of the polyolefin resin. By setting the blended amount of the foaming agent to be 1 part by mass or more, the expandable sheet can be appropriately foamed, and it is possible to impart appropriate flexibility and impact absorption to the foam sheet. Further, by setting the blended amount of the foaming agent to be 30 parts by mass or less, it is possible to prevent the foam sheet from foaming more than necessary and the mechanical strength of the foam sheet can be improved.

<Additives>

A crosslinking aid may be blended in the expandable composition. As the crosslinking aid, a polyfunctional monomer can be used. By adding a crosslinking aid to the polyolefin resin, the amount of ionizing radiation irradiated in step (2) described later is reduced, and cleaving and degradation of the resin molecules from the irradiation of the ionizing radiation is prevented.

Specifically, examples of the crosslinking aid include a compound having three functional groups in one molecule such as trimethylolpropane trimethacrylate, trimethylolpropane triacrylate, trimellitic acid triallyl ester, 1,2,4-benzenetricarboxylic acid triallyl ester, and triallyl isocyanurate, a compound having two functional groups in one molecule such as 1,6-hexanediol dimethacrylate, 1,9-nonanediol dimethacrylate, 1,10-decanediol dimethacrylate, and divinylbenzene, diallyl phthalate, diallyl terephthalate, diallyl isophthalate, ethyl vinylbenzene, neopentyl glycol dimethacrylate, lauryl methacrylate, stearyl methacrylate, and the like.

These crosslinking aids are used alone or in combination of two or more.

The amount of the crosslinking aid added is preferably 0.5 to 10 parts by mass, more preferably 1.0 to 8 parts by mass, and further preferably 1.5 to 5 parts by mass, with respect to 100 parts by mass of the polyolefin resin. By setting the addition amount to be 0.5 parts by mass or more, the crosslinking degree desired for the foam sheet can be stably obtained, and by setting the addition amount to be 10 parts by mass or less, the crosslinking degree of the foam sheet can be easily controlled.

A decomposition temperature adjusting agent may be blended in the expandable composition. The decomposition temperature adjusting agent is blended to reduce the decomposition temperature of the thermally decomposable foaming agent and to increase or adjust the decomposition rate. Specific examples of such a compound include zinc oxide, zinc stearate, urea, and the like. The decomposition temperature adjusting agent is blended in an amount of, for example, 0.01 to 5 parts by mass with respect to 100 parts by mass of the polyolefin resin in order to adjust the surface condition of the foam sheet.

An antioxidant may be blended in the expandable composition. Examples of the antioxidant include a phenolic antioxidant such as 2,6-di-t-butyl-p-cresol, a sulfur antioxidant such as dilaurylthiodipropionate, a phosphorus antioxidant, an amine antioxidant, and the like. The antioxidant is blended in an amount of, for example, 0.01 to 5 parts by mass with respect to 100 parts by mass of the polyolefin resin.

In addition to these, additives generally used in a foam, such as a heat stabilizer, a colorant, an antistatic agent, and a filler, may also be blended in the expandable composition.

In the foam sheet, the polyolefin resin is the main component, and the content of the polyolefin resin is, for example, 45% by mass or more, preferably 50% by mass or more, and more preferably 55% by mass or more, based on the total amount of the foam sheet.

<Method for Producing Foam Sheet>

The foam sheet of the present invention can be produced by foaming the polyolefin resin by a general method. The production method is not limited, and the foam sheet can be produced by crosslinking the expandable composition including at least the polyolefin resin and the foaming agent as necessary, and then foaming.

Specifically, the foam sheet of the present invention can be produced by a method having the following steps (1) to (3), for example.

Step (1): A step of obtaining an expandable composition in the form of a sheet by feeding the polyolefin resin, the thermally decomposable foaming agent, and other additives to an extruder, melt-kneading, and extruding into a sheet from the extruder.

Step (2): A step of cross-linking the expandable composition in the form of a sheet.

Step (3): A step of heating the crosslinked sheet-like expandable composition, foaming the thermally decomposable foaming agent, and preferably stretching in one or both of the MD direction and the TD direction.

In addition to this method, the cross-linked polyolefin resin foam sheet can also be produced by the method described in WO 2005/007731 (A).

The method for foaming the expandable composition is not particularly limited, and examples thereof include a method of heating the expandable composition with hot air, a method of heating the expandable composition with infrared rays, a method of heating the expandable composition in a salt bath, a method of heating the expandable composition in an oil bath, and the like. These methods may be used in combination.

The foaming of the expandable composition is not limited to examples in which a thermally decomposable foaming agent is used, and physical foaming with butane gas or the like may be used.

Examples of the method of cross-linking the expandable composition include a method in which the expandable composition is irradiated with ionizing radiation such as an electron beam, α-rays, β-rays, and γ-rays, a method in which an organic peroxide is blended in the expandable composition in advance and the expandable composition is heated to decompose the organic peroxide, and the like. These methods may be used in combination. Among these, a method of irradiating ionizing radiation is preferable.

The irradiation amount of the ionizing radiation is preferably 0.5 to 20 Mrad, and more preferably 1.0 to 12 Mrad, so that the gel fraction is within the above-described range.

Examples of the organic peroxide used for crosslinking include 1,1-bis(t-butylperoxy)3,3,5-trimethylcyclohexane, 1,1-bis(t-butylperoxy)cyclohexane, and the like. These may be used alone or in combination of two or more. The added amount of the organic peroxide is preferably 0.01 to 5 parts by mass, and more preferably 0.1 to 3 parts by mass, with respect to 100 parts by mass of the polyolefin resin. When the added amount of the organic peroxide is within the above-described range, crosslinking of the expandable composition proceeds more easily, and the amount of decomposed residue of the organic peroxide in the obtained cross-linked polyolefin resin foam sheet is suppressed.

The polyolefin resin foam sheet of the present invention is preferably stretched as described above. The stretching may be performed after foaming the expandable composition to obtain the foam sheet, or may be performed while foaming the expandable composition. When the foam sheet is stretched after foaming the expandable composition to obtain the foam sheet, it is better to immediately stretch the foam sheet while maintaining a molten state at the time of foaming without cooling the foam sheet. However, the foam sheet may also be stretched after cooling the foam sheet and then again heating the foam sheet to be in a molten or softened state.

Further, the stretching ratio of the polyolefin resin foam sheet in the MD direction is preferably 1.1 to 3.0 times, and more preferably 1.3 to 2.8 times. By setting the stretching ratio of the polyolefin resin foam sheet in the MD direction to be equal to or more than the lower limit value, the flexibility and tensile strength of the polyolefin resin foam sheet tend to be better. On the other hand, by setting the stretching ratio to be equal to or less than the upper limit value, the foam sheet can be prevented from breaking during the stretching, and it is possible to prevent a reduction in the expansion ratio due to the foaming gas escaping from the foam sheet during foaming, and as a result the flexibility and tensile strength of the polyolefin resin foam sheet are better and the quality tends to be more uniform. Further, the polyolefin resin foam sheet may be stretched in the TD direction in a stretching ratio in the above-described range.

[Pressure-Sensitive Adhesive Tape]

In the present invention, the foam sheet according to the present invention may be used as a base material, and a pressure-sensitive adhesive layer may be provided on one or both sides of the foam sheet to form a pressure-sensitive adhesive tape. The thickness of the pressure-sensitive adhesive tape is usually about 2 to 16 mm.

The thickness of the pressure-sensitive adhesive layer constituting the pressure-sensitive adhesive tape is preferably 5 to 200 μm, more preferably 7 to 150 μm, and further preferably 10 to 100 μm. When the thickness of the pressure-sensitive adhesive layer constituting the pressure-sensitive adhesive tape is 5 to 200 μm, the thickness of the pressure-sensitive adhesive tape can be thinner.

The pressure-sensitive adhesive constituting the pressure-sensitive adhesive layer provided on one or both sides of the foam sheet is not particularly limited, and for example, an acrylic pressure-sensitive adhesive, a urethane pressure-sensitive adhesive, a rubber pressure-sensitive adhesive, and the like is used.

Examples of the method of applying the pressure-sensitive adhesive to the foam sheet and laminating the pressure-sensitive layer on the foam sheet include a method in which the pressure-sensitive adhesive is applied to at least one side of the foam sheet using an application machine such as a coater, a method in which the pressure-sensitive adhesive is sprayed and applied on at least one side of the foam sheet using a spray, a method in which the pressure-sensitive adhesive is applied on one side of the foam sheet using a brush, and the like.

The pressure-sensitive adhesive tape using the foam sheet of the present invention can be suitably used as an impact absorbing material in an aircraft. Further, the pressure-sensitive adhesive tape can also be used as an impact absorbing material or the like installed in the main body of an electronic device.

EXAMPLE

The present invention will be now described in more detail by way of examples, but the present invention is not limited to these examples.

[Measurement Methods]

The methods for measuring each physical property in this specification are as follows.

<Apparent Density and Area Density>

The apparent density of the foam sheet was measured in accordance with JIS K7222: 2005.

The area density of the foam sheet was calculated based on the apparent density and thickness.

<25% Compressive Strength>

The 25% compressive strength of the foam sheet was measured at 23° C. in accordance with JIS K6767.

<Time (t) Required for Weight Decrease from 90% by Mass to 10% by Mass>

Thermogravimetric analysis was performed using a device name: TA7000, manufactured by Hitachi High-Tech Science Corporation at a heating rate of 10° C./min and a measurement temperature of 23° C. to 550° C., and the time (t) required for decrease in the weight of the foam sheet from 90% by mass to 10% by mass was calculated by subtracting the elapsed time when the weight reached 10% by mass from the elapsed time when the weight reached 90% by mass from the start of measurement.

<Maximum Heating Value and Total Heating Value>

The maximum heating value and the total heating value of the foam sheet were measured in accordance with FAR PART 25 Appendix F Part IV.

<Crosslinking Degree (Gel Fraction)>

Approximately 100 mg of a sample piece was collected from the foam sheet, and a weight A (mg) of the sample piece was precisely weighed. Next, the sample piece was dipped in 30 cm$^3$ of xylene at 120° C., left for 24 hours, then filtered through a 200 mesh wire mesh to collect the insoluble matter on the wire mesh. The insoluble matter was vacuum dried, and a weight B (mg) of the insoluble matter was precisely weighed. From the obtained values, the cross-linking degree (% by mass) was calculated based on the following formula.

Crosslinking degree (% by mass)=(B/A)×100

<Evaluation of Fire Retardancy>

The fire retardancy of the foam sheet was evaluated based on the above-described maximum heating value and total heating value.

Specifically, cases in which the maximum heating value during a 5-minute test was 65 kW/m$^2$ or less and the total heating value for 2 minutes after the start of the test was 65 kW·min/m$^2$ or less were evaluated as a pass, and other cases were evaluated as a fail.

[400° C. Remaining Weight Percent (% by Mass)]

In the above-described thermogravimetric analysis, the remaining weight percent when heated to 400° C. was calculated by dividing the weight of the foam sheet when the measurement temperature reached 400° C. by the weight before measurement.

<Starting Materials Used>

The materials used in the examples and comparative examples are as follows.

[Polyolefin Resin]
  Polypropylene: "EG7F" manufactured by Japan Polypropylene Corporation
  Polyethylene: "5220G" manufactured by Dow Chemical Co., Ltd.
[Crosslinking Aid]
  Crosslinking aid: Trimethylolpropane trimethacrylate

[Foaming Agent]
  Thermally decomposable foaming agent: Azodicarbonamide
[Antioxidant]
  Antioxidant A: 2,6-di-t-butyl-p-cresol
  Antioxidant B: Dilaurylthiodipropionate
[Fire Retardant]
  Fire retardant A: Phosphorus compound, Teijin Limited "Fireguard FCX-210", melting point 257° C.
  Fire retardant B: Intumescent fire retardant (compound product), "ADK STAB FP-2500S" manufactured by ADEKA Corporation, melting point 270° C.
  Fire retardant C: Phosphoric acid ester, Daihachi Chemical Industry Co., Ltd., "TMCPP", melting point 23° C. or less (liquid at ordinary temperature)
  Fire retardant D: Bis(pentabromophenyl)ethane, Albemarle Japan Co., Ltd. "SAYTEX8010", melting point 350° C.
[Fire Retardant Aid]
  Fire retardant aid: Antimony trioxide, Nihon Seiko Co., Ltd. "PATOX-M", melting point 656° C.

Example 1

80 parts by mass of polypropylene, 20 parts by mass of polyethylene, 3.2 parts by mass of crosslinking aid, 20 parts by mass of thermally decomposable foaming agent, 30 parts by mass of fire retardant A, 0.5 parts by mass of antioxidant A, and 0.3 parts by mass of antioxidant B were mixed and kneaded with a laboplast mill. Then, a 2 mm expandable polyolefin resin sheet (hereinafter referred to as "expandable sheet") was prepared by heat-pressing the expandable polyolefin resin composition at 180° C. and 15 MPa.

Next, an electron beam with an acceleration voltage of 1000 kV and 1.4 Mrad was irradiated from both sides of the prepared expandable sheet. Then, the expandable sheet was placed in a hot air oven set to 250° C. for 4 minutes, and then promptly taken out to obtain a polyolefin resin foam sheet.

Table 1 shows the evaluation results of the obtained foam sheet.

Examples 2 to 10 and Comparative Examples 1 to 5

The same procedures as in Example 1 were carried out, except that the blend of the expandable composition was changed as shown in Table 1 and the dosage at the time of cross-linking was adjusted so as to achieve the crosslinking degree (gel fraction) shown in Table 1.

Table 1 shows the evaluation results of the obtained foam sheets.

TABLE 1

|  |  |  | Example | | | | | | | | | | Comparative Example | | | | |
|---|---|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 | 4 | 5 |
| Blend (phr) | Polyolefin resin | Polypropylene | 80 | 80 | 80 | 80 | 80 | 80 | 80 | 80 | 0 | 0 | 80 | 80 | 80 | 80 | 0 |
|  |  | Polyethylene | 20 | 20 | 20 | 20 | 20 | 20 | 20 | 20 | 100 | 100 | 20 | 20 | 20 | 20 | 100 |
|  | Antioxidant | 2,6-di-t-butyl-p-cresol | 0.5 | 0.5 | 0.5 | 0.5 | 0.5 | 0.5 | 0.5 | 0.5 | 0.3 | 0.3 | 0.5 | 0.5 | 0.5 | 0.5 | 0.3 |
|  |  | dilaurylthiodipropionate | 0.3 | 0.3 | 0.3 | 0.3 | 0.3 | 0.3 | 0.3 | 0.3 | 0 | 0 | 0.3 | 0.3 | 0.3 | 0.3 | 0 |
|  | Crosslinking aid | trimethylolpropane trimethacrylate | 3.2 | 2.5 | 3.2 | 2.5 | 3.2 | 3.2 | 3.2 | 2.5 | 0 | 0 | 3.2 | 3.2 | 3.2 | 3.2 | 0 |

TABLE 1-continued

|  |  | Example | | | | | | | | | | Comparative Example | | | | |
| --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 1 | 2 | 3 | 4 | 5 |
|  | Thermally decomposable foaming agent azodicarbonamide | 20 | 28 | 20 | 24 | 20 | 12 | 20 | 24 | 22 | 22 | 20 | 12 | 12 | 12 | 16 |
| Fire retardant | Fire retardant A | 30 | 15 | 30 | 15 | 0 | 0 | 15 | 15 | 0 | 0 | 0 | 0 | 30 | 0 | 0 |
|  | Fire retardant B | 0 | 0 | 0 | 60 | 0 | 0 | 0 | 15 | 45 | 0 | 0 | 0 | 0 | 0 | 0 |
|  | Fire retardant C | 0 | 0 | 0 | 0 | 0 | 0 | 0 | 0 | 0 | 0 | 0 | 0 | 0 | 12 | 0 |
|  | Fire retardant D | 0 | 0 | 0 | 0 | 30 | 5 | 30 | 15 | 0 | 5 | 0 | 15 | 0 | 0 | 0 |
|  | fire retardant aid | 0 | 0 | 0 | 0 | 0 | 2.5 | 0 | 0 | 0 | 2.5 | 0 | 8 | 0 | 0 | 0 |
| Specification | Sheet thickness (mm) | 7 | 7 | 14 | 6 | 6 | 5 | 7 | 7 | 6 | 6 | 6 | 9 | 12 | 5 | 6 |
|  | Density (kg/m$^3$) | 23 | 15 | 23 | 31 | 28 | 40 | 27 | 25 | 25 | 25 | 23 | 61 | 36 | 24 | 33 |
|  | Area density (g/m$^2$) | 161 | 105 | 322 | 186 | 168 | 200 | 189 | 175 | 150 | 150 | 138 | 549 | 432 | 120 | 198 |
|  | 25% Compressive strength (kPa) | 43 | 21 | 45 | 33 | 73 | 77 | 52 | 50 | 42 | 44 | 43 | 93 | 65 | 42 | 35 |
|  | Gel fraction | 45 | 43 | 45 | 53 | 36 | 49 | 35 | 42 | 49 | 35 | 45 | 43 | 45 | 36 | 24 |
| Thermal decomposition behavior | Time required for weight decrease from 90% by mass as by mass to measured by thermogravimetric analysis | 16.1 | 19.0 | 16.1 | >22.5 | 10.3 | 10.3 | 17.6 | >20 | >20 | 13.9 | 8.1 | 12.2 | 16.1 | 8.3 | 8.5 |
|  | 400° C. Remaining weight percent | 73% | 58% | 73% | 68% | 42% | 47% | 49% | 61% | 76% | 83% | 39% | 50% | 73% | 21% | 86% |
| Fire retardancy | Evaluation | pass | pass | pass | pass | pass | pass | pass | pass | pass | pass | fail | fail | fail | fail | fail |
|  | Maximum heating value (kw/m$^2$) | 47 | 35 | 63 | 44 | 43 | 59 | 42 | 42 | 58 | 49 | 70 | 160 | 79 | 80 | 88 |
|  | Total heating value (kW · min/m$^2$) | 38 | 27 | 56 | 28 | 29 | 50 | 33 | 26 | 44 | 34 | 35 | 144 | 79 | 35 | 43 |

As is clear from the above results, the polyolefin resin foam sheet of the present invention has a high fire retardancy while maintaining a lightweight property, and therefore can be suitably used for applications requiring reduced weight, such as aircraft.

The invention claimed is:

1. A polyolefin resin foam sheet having an area density of 5 g/m$^2$ or more and 400 g/m$^2$ or less, and having a time (t) required for a weight decrease from 90% by mass to 10% by mass, of 9 minutes or more, as measured by thermogravimetric analysis carried out at a heating rate of 10° C./min and a measurement temperature of 23° C. to 550° C., wherein the polyolefin resin foam sheet has an apparent density of 0.035 g/cm3 or less, wherein a polyolefin resin constituting the polyolefin resin foam sheet is a combination of a polyethylene resin and a polypropylene resin, wherein the polyolefin resin foam sheet comprises 5 to 50 parts by mass of a fire retardant with respect to 100 parts by mass of a polyolefin resin, and, wherein the fire retardant consists only of a phosphorus spiro compound.

2. The polyolefin resin foam sheet according to claim 1, wherein the polyolefin resin foam sheet has a residual weight percent when heated to 400° C. of 40% by mass or more as measured by the thermogravimetric analysis.

3. A pressure-sensitive adhesive tape, comprising:

a base material of the polyolefin resin foam sheet according to claim 1; and a pressure-sensitive adhesive layer disposed on one or both sides of the polyolefin resin foam sheet.

* * * * *